United States Patent Office 2,785,104
Patented Mar. 12, 1957

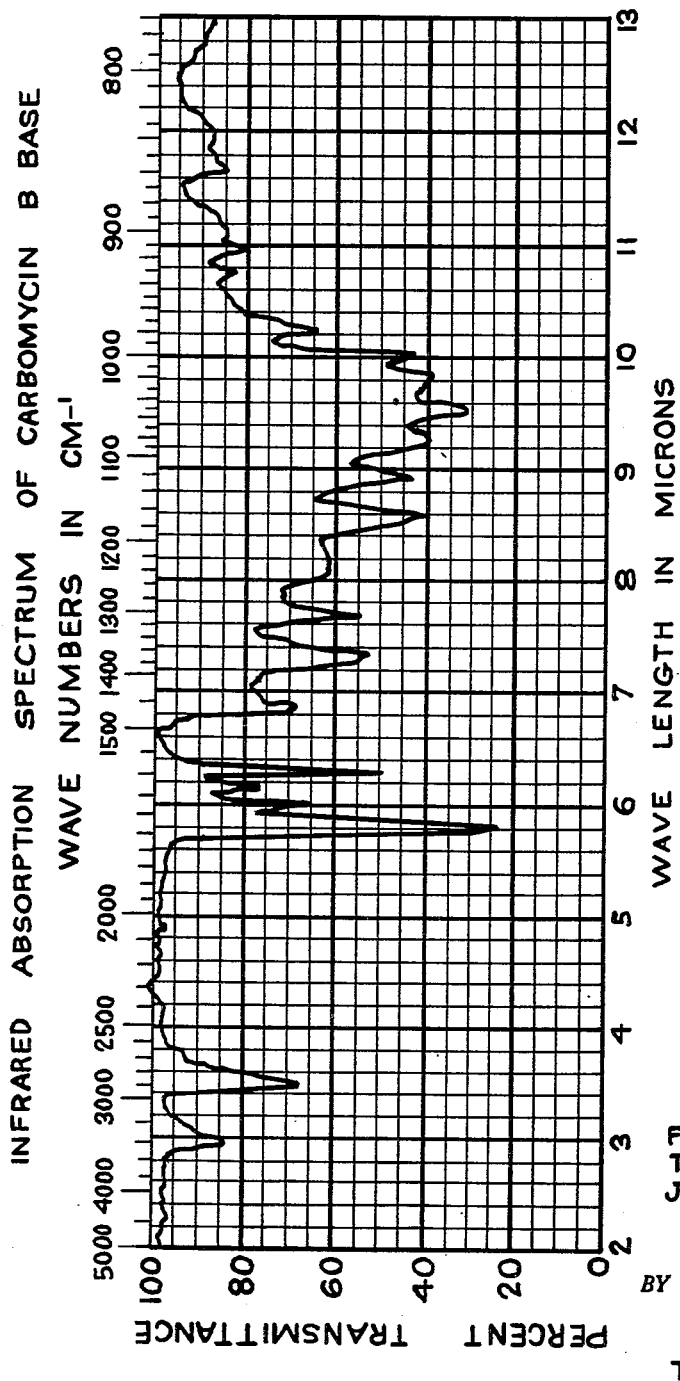

2,785,104

ANTIBIOTIC CARBOMYCIN B AND ITS SALTS

Fred W. Tanner, Jr., and Thomas M. Lees, Baldwin, N. Y., and John B. Routien, Tenafly, N. J., assignors to Chas. Pfizer & Co., Inc., Brooklyn, N. Y., a corporation of Delaware Application April 2, 1953, Serial No. 346,464

4 Claims. (Cl. 167—65)

This invention is concerned with a hitherto undescribed compound which shows a high order of biological activity.

Carbomycin A is a highly active antibiotic produced by cultivation under suitable conditions of certain strains of the microorganism *Streptomyces halstedii*. This antibiotic, its preparation by fermentation, isolation and purification are disclosed and claimed in the copending patent application of Fred W. Tanner, Jr., et al., Serial No. 270,298, filed on February 7, 1952, of which this application is a continuation-in-part. It has been found that a second compound possessing a high order of microbiological activity is present in certain residual materials formed during the purification of carbomycin A. This product, which has been designated carbomycin B, has been isolated from this source.

Carbomycin A may be recovered by extraction into various water immiscible organic solvents such as aromatic hydrocarbons, halogenated hydrocarbons, ketones, ethers and esters at neutral to basic pH's from aqueous solutions such as fermentation broth. The antibiotic may be reextracted from solutions in water-immiscible solvents into dilute aqueous acids such as hydrochloric acid, sulfuric acid, phosphoric acid, etc. Purification may be achieved by reextracting the antibiotic at a neutral to basic pH into a water-immiscible solvent. Concentration of such a solution yields a highly active carbomycin A base. When carbomycin A base is crystallized from such a solvent solution, the residual mother liquor is enriched in carbomycin B and the latter may be recovered from this source. This is particularly true of mother liquors obtained after removal of a second crop of carbomycin A base. These mother liquors containing carbomycin B as well as some carbomycin A are highly active and may be used, for instance, in animal therapy.

Carbomycin B may be isolated by addition of water to carbomycin A mother liquors obtained by the crystallization-purification process described above. A crude product is isolated which contains both carbomycin A and carbomycin B. This material when dissolved in a minimum volume of ethanol, i. e. approximately two milliliters of solvent per gram of solid, and seeded with carbomycin A crystals will deposit a crop of carbomycin A crystals. It is advisable to stir the mixture overnight at about room temperature to complete this crystallization. If the solvent is then removed from the mother liquor under vacuum and the residue dissolved in the minimum volume of acetone with the addition of water until turbidity develops, there will be formed a crop of carbomycin B crystals. To further purify this material, it may be recrystallized from a mixture of acetone and water.

Carbomycin B purified in the manner described above is a white crystalline compound which is basic in nature. It possesses a characteristic ultraviolet absorption spectrum displaying a maximum at 278 mµ

$$(E_{1\,cm.}^{1\%} = 270)$$

It displays a minimum at 230 mµ

$$(E_{1\,cm.}^{1\%} = 30)$$

The maximum in the ultraviolet absorption provides a convenient method of determining the concentration of carbomycin B, for instance, in mixtures with carbomycin A. The infrared absorption spectrum of carbomycin B is shown in the attached drawing (Fig. 1). The drawing is of the spectrum as determined on a solution of carbomycin B base in chloroform solution. The principal absorption maxima of carbomycin B as determined in chloroform solution occur at the following frequencies expressed in reciprocal centimeters: 3413, 2857, 1718, 1666, 1626, 1590, 1453, 1360, 1295, 1160, 1119, 1083, 1072, 1046, 1012, 993, 975, 913, and 854. If the spectrum is determined with a mull of carbomycin B base in mineral oil, two additional absorption maxima are apparent at 1238 and 1220 cm.$^{-1}$. The infrared absorption spectrum is similar in many respects to that of carbomycin A. However, the band at 1690 cm.$^{-1}$ is shifted to 1672 cm.$^{-1}$ and the 1630 band of carbomycin A is reduced considerably in intensity. Furthermore, a strong band occurs at 1590 which does not occur in the carbomycin A spectrum. The band at 993 is either absent or very weak in carbomycin A.

Analysis of carbomycin B has given the following values for the percent composition:

|  | Percent by weight |
|---|---|
| Carbon | 60.55 |
| Hydrogen | 8.42 |
| Nitrogen | 1.82 |
| Oxygen (by difference) | 29.21 |

Carbomycin B is optically active having a rotation of $[\alpha]_D^{25} = -35°$ (2% solution in chloroform).

Carbomycin B shows a high order of activity in inhibiting the growth of gram-positive microorganisms. It also shows considerable activity against certain mycobacteria. In fact, this activity in some cases is somewhat higher than carbomycin A. Carbomycin B displays a low order of toxicity when tested against the usual laboratory animals. The antibiotic is highly useful in the treatment of infections due to susceptible microorganisms in various animals.

Carbomycin B is quite soluble in a variety of organic solvents. The following table lists the approximate solubility of carbomycin B base in various solvents:

|  | Grams/ml. |
|---|---|
| Methanol | 1.4 |
| Ethanol | 0.45 |
| Benzene | 0.15 |
| Ether | 0.03 |
| Acetone | 0.25 |

Carbomycin B base, however, has a very low solubility in water, about 0.125 milligram per milliliter. All of these solubilities were determined at about room temperature (20–25° C.). Not only is carbomycin B appreciably more soluble in organic solvents, but it possesses a considerably more pleasant taste than does carbomycin A. This is of importance in connection with the use of an orally administrable antibiotic. Crystalline carbomycin B base has a melting point of approximately 140–144° C. and it melts with decomposition.

Carbomycin B readily forms salts with a variety of inorganic and organic acids. These are formed, for example, when water-immiscible solvent solutions of carbomycin B-containing material are extracted with dilute aqueous acids. They may also be prepared by suspending the base in water and gradually adding sufficient acid to neutralize the base. The solid salts may then be recovered either by addition of certain water-miscible solvents or by concentration of the solution. In general, the salts have a higher solubility in water and a lower solubility in most solvents than does the base. Salts may be prepared with such acids as sulfuric, hydrochloric, phosphoric, tartaric, citric, fumaric and so forth.

The following examples are given by way of illustration and are not to be considered as the only manner in which this invention may be embodied. It is to be understood that protection hereof is only to be limited by the specific wording of the appended claims.

*Example I*

A selected strain of *Streptomyces halstedii* was cultivated in a nutrient medium under submerged aerobic conditions until the medium displayed a considerable antibiotic activity. More detailed directions are given in the copending patent application referred to above. The carbomycin A was isolated by extraction into methyl isobutyl ketone. It was then reextracted into dilute acid and from the aqueous solution into a water-immiscible solvent at pH 6.5 as described in the Tanner et al. application. The solvent solution of the antibiotic was concentrated to obtain crude crystalline carbomycin A containing some carbomycin B. The carbomycin A base was recrystallized from methanol. A second crop of carbomycin A was obtained by concentrating the methanolic solution.

The mother liquor remaining after removal of the second crop of crystals was treated with water to precipitate a crude mixture of carbomycin A and carbomycin B. The mixture was dissolved in two volumes of hot ethanol and the solution was allowed to cool gradually with stirring overnight. While the solution was cooling, seeds of crystalline carbomycin A base were added and in the morning the crystalline carbomycin A that had separated was filtered. The ethanol solution was concentrated to dryness under vacuum and the dry residual crude material which contained a high proportion of carbomycin B was dissolved in two volumes of acetone. Water was slowly added to the acetone solution until it was slightly turbid. The mixture was stored at room temperature overnight. In the morning the crystalline product was filtered and it was then recrystallized from acetone and water by the same procedure. The recrystallized product proved to be carbomycin B of high purity. It had a melting point of 140–144° C. with decomposition.

*Example II*

Crystalline carbomycin B base was suspended in a small volume of water and dilute hydrochloric acid was added until the pH remained at about 3. A clear solution was obtained from which crystalline carbomycin B hydrochloride gradually separated. The salt is a white crystalline compound somewhat more soluble in water than the base and less soluble in water than carbomycin A hydrochloride. Carbomycin B hydrochloride is highly active against various gram-positive bacteria.

Other salts of carbomycin B may be made by the same procedure, although the salts vary considerably in their aqueous solubility. Alternatively, water-immiscible solvent solutions of the base either in purified form or as mixtures with carbomycin A and other active or inert materials may be extracted with dilute aqueous acids as described in the Tanner et al. application referred to above. There is thus obtained an aqueous solution containing the carbomycin B salt corresponding to the dilute acid used. A solid product may be obtained by careful removal of the water.

What is claimed is:

1. A compound capable of inhibiting the growth of gram-positive microorganisms chosen from the group consisting of carbomycin B, a basic substance soluble in organic solvents, but slightly soluble in water, having an ultraviolet absorption maximum at about 278 m$\mu$ $$(E_{1cm.}^{1\%} = 270)$$

and a minimum at 230 m$\mu$ $$(E_{1cm.}^{1\%} = 30)$$

an optical rotation of approximately $[\alpha]_D^{25} = -35°$ (2% solution in chloroform), when dissolved in chloroform exhibiting characteristic absorption maxima in the infrared region at the following frequencies expressed in reciprocal centimeters: 3413, 2857, 1718, 1666, 1626, 1590, 1453, 1360, 1295, 1160, 1119, 1083, 1072, 1046, 1012, 993, 975, 913 and 854 and having a composition by weight of approximately 60.55% carbon, 8.42% hydrogen, 1.82% nitrogen, and 29.21% oxygen (by difference); and the acid salts thereof.

2. The basic substance claimed in claim 1.

3. An acid salt of carbomycin B, the basic substance claimed in claim 1.

4. The hydrochloride salt of carbomycin B, the basic substance claimed in claim 1.

References Cited in the file of this patent

UNITED STATES PATENTS

| | | |
|---|---|---|
| 2,516,080 | Sobin et al. | July 18, 1950 |
| 2,653,899 | Bunch et al. | Sept. 29, 1953 |

OTHER REFERENCES

Alexopoulos et al.: "Ohio Journal of Science," vol. 41, 1941, pp. 425–430.

Gardner et al.: Brit. J. Exptl. Path., 1942, vol. 23, pp. 123–127.

Kocholaty et al.: J. Biol. Chem., May 1947, pp. 765 to 769.

"Bergey's Manual of Determinative Bacteriology," p. 953, 6th edition, 1948.

"Antibiotics," by Florey et al., pp. 373–376, vol. I, published by Oxford Med. Publications, 1949.

Waksman: "The Actinomycetes," published 1950, pp. 116 to 119.

Editorial and article by McGuire et al. in "Antibiotics & Chemotherapy," vol. II, No. 6, June 1952, pp. 279–283.

Hochstein et al.: J. A. C. S., vol. 20, October 1954, pp. 5080–5083.

Klarman: American J. of Pharmacy, July 1955, pp. 252–254.